No. 769,745. PATENTED SEPT. 13, 1904.
F. F. HENDRICKSON.
BROILER.
APPLICATION FILED APR. 15, 1903.
NO MODEL.

Witnesses
Inventor,
Forest F. Hendrickson
Per
D. B. Replogle
Attorney

No. 769,745.

Patented September 13, 1904.

UNITED STATES PATENT OFFICE.

FOREST F. HENDRICKSON, OF SCRANTON, PENNSYLVANIA.

BROILER.

SPECIFICATION forming part of Letters Patent No. 769,745, dated September 13, 1904.

Application filed April 15, 1903. Serial No. 152,675. (No model.)

*To all whom it may concern:*

Be it known that I, FOREST F. HENDRICKSON, a citizen of the United States, residing at Scranton, in the county of Lackawanna and State of Pennsylvania, have invented certain new and useful Improvements in Broilers, of which the following is a specification.

This invention relates to gridirons or broilers such as are adapted for broiling meats or toasting bread, cheese, or the like; and the objects of the invention are to provide a gridiron with a suitable cover to close the entire opening made in the range or stove for the purpose of exposing meats on gridirons of the kind, to provide an improved supporting device for such gridirons, and to make them more readily and easily reversible and separable to render them more cleanly and more efficient and convenient generally.

To these ends the invention consists of the construction, arrangement, and combination of the several parts, as herein set forth, and illustrated in the accompanying drawings, in which—

Figure 1:
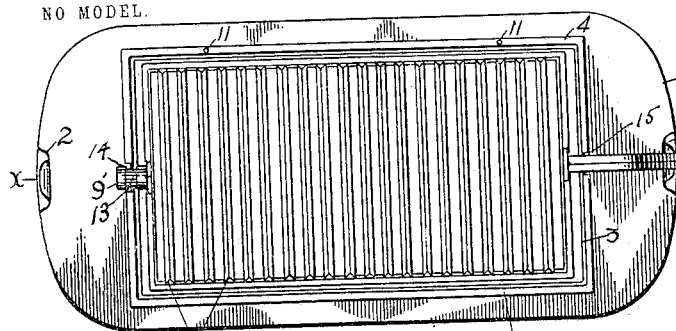
Figure 5:
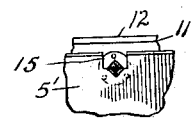
Figure 2:
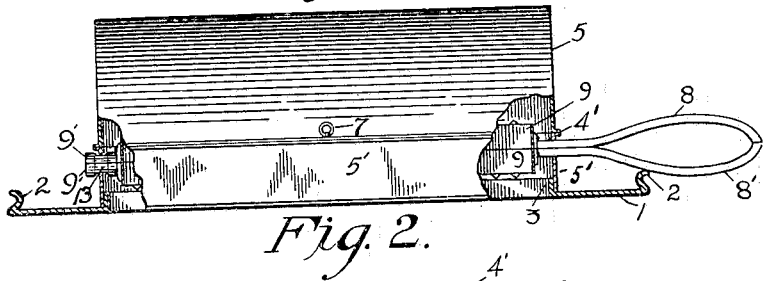
Figure 6:
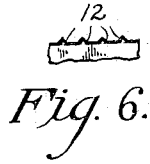
Figure 3:
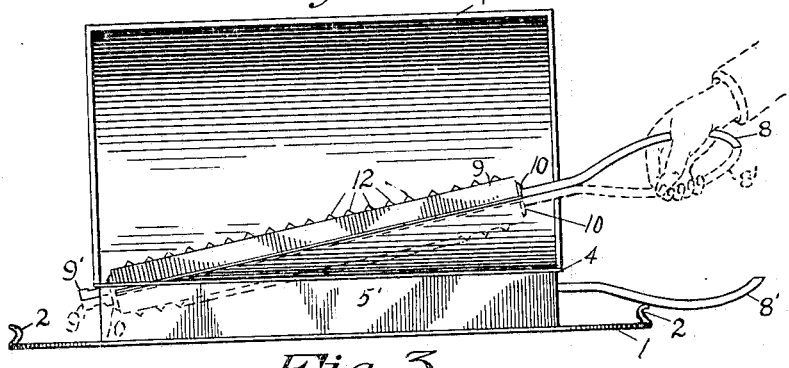
Figure 4:
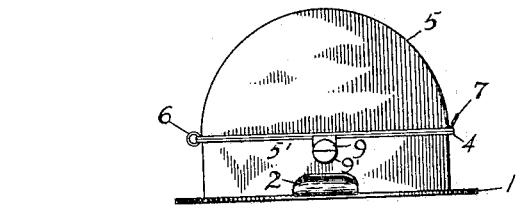

Figure 1 is a top plan view of one of my improved broilers with the cover removed. Fig. 2 is a side elevation, partly in cross-section, taken on the line $x\ x$ of Fig. 1. Fig. 3 is a similar side elevation with the lid of the broiler open and showing the method of separating the halves of the broiler. Fig. 4 is an end elevation of the broiler with the lid in position. Fig. 5 is a detail, partly in cross-section, of the handles and that part of the end of the broiler in which the handles rest. Fig. 6 is a partial sectional view showing the construction of the bars of the gridiron.

Similar characters of reference denote like and corresponding parts throughout the several views.

Referring to the drawings, 1 denotes a flange of the frame or base suitably made from cast-iron or plate metal. Handles 2 2 are suitably attached to the ends of said flange, and a transverse flange or lip 3, extending perpendicular to the flange 1, bounds the central opening through the base and is adapted to have slid over it and secured to it a trunk 5', having a lip or rim 4 extending around it. A corresponding rim 4' of the lid 5 is adapted to rest or coincide with the said rim. The lid 5 is hinged to the trunk 5' by means of rings 6, which pass through registering holes 11 11 in the rims 4 and 4'. An additional ring 7, attached to the lid, serves for opening the same.

The gridiron proper is composed of two similar pieces 9 9, having handles 8 8' secured to them at 10 10 by means of rivets or otherwise. The ends of the gridiron members opposite the handles are provided with gudgeons semicircular in cross-section, the two forming a cylindrical gudgeon with a neck 13, which is designed to rest on the bearing 14, cut into the end of the trunk 5'. A notch 15 in the opposite end of the trunk 5' serves as a bearing for the handles 8 8', the bottom of said notch 15 being cut to conform to the shape of the handles and designed to prevent them from revolving while lying on the bottom of said notch. The ribs or bars 12 of the gridirons are stiffened by embossing or bending at angles, as shown particularly in Fig. 6. Any pattern of bars or gridiron work may be substituted for that shown.

In using the device, the lid 5 being thrown back, as in Fig. 3, the lower half of the gridiron, which is provided with the handle 8', is placed in position to receive the article to be cooked, or the article may be inserted before the two parts are together, as shown in dotted lines in the same figure. They are then closed together and the lid closed down, as suggested in Fig. 2, the lid of course being of sufficient height to permit the turning of the gridiron proper underneath. Turning is accomplished by lifting the handles together upward to the upper part of the notch 15 and holding the handles together during the operation.

Having thus described my invention, I do not wish to be confined to the exact construction set forth, as many of the parts may be varied without departing from the general spirit of my invention.

What I claim, and desire to secure by Letters Patent, is—

In a broiler, a base-piece, a trunk fitted thereto and having recessed ends one of which forms a bearing for a rotatable member and the other an angular socket in which said member is held against rotation, a gridiron comprising two sections each having a semicircular gudgeon, the two fitting together to form a cylindrical gudgeon fitted to the bearing in the trunk, handles on the sections of the gridiron angular in cross-section and fitted to the socket of the trunk substantially as described.

In testimony whereof I affix my signature in presence of two witnesses.

FOREST F. HENDRICKSON.

Witnesses:
E. B. FRANKLIN,
S. C. VESEY.